United States Patent [19]

Defour

[11] Patent Number: 5,291,196
[45] Date of Patent: Mar. 1, 1994

[54] COLLISION-AVOIDANCE METHOD FOR COOPERATING CARRIERS AND ONBOARD OPTICAL ASSEMBLY DESIGNED FOR ITS IMPLEMENTATION

[75] Inventor: Martin Defour, Croissy sur Seine, France

[73] Assignee: Thomson-CSF, Puteaux, France

[21] Appl. No.: 933,190

[22] Filed: Aug. 20, 1992

[30] Foreign Application Priority Data

Sep. 3, 1991 [FR] France ................... 91 10864

[51] Int. Cl.⁵ ............................................... G08G 5/04
[52] U.S. Cl. ....................................... 340/961; 340/963;
                                                       342/29; 342/54
[58] Field of Search ................... 340/961, 963, 964;
        364/461; 342/29, 54, 61, 65; 73/178 R, 178 T;
                               250/353; 455/609; 244/175

[56] References Cited

U.S. PATENT DOCUMENTS

| | | | |
|---|---|---|---|
| 2,994,867 | 8/1961 | Pierce | 342/29 |
| 3,052,882 | 9/1962 | Pidhayhy et al. | 340/961 |
| 3,551,676 | 12/1970 | Runnels | 340/961 |
| 3,620,626 | 11/1971 | Daly et al. | 340/961 |
| 3,708,671 | 1/1973 | Story | 315/153 |
| 4,277,170 | 7/1981 | Miles | 356/152 |
| 4,527,158 | 7/1985 | Runnels | 340/961 |
| 4,755,818 | 7/1988 | Conrad | 340/961 |
| 4,918,442 | 4/1990 | Bogart, Jr. | 340/961 |
| 5,057,833 | 10/1991 | Carlson | 340/961 |

FOREIGN PATENT DOCUMENTS

2537119 8/1984 France .
9106873 5/1991 World Int. Prop. O. .

*Primary Examiner*—Brent Swarthout
*Attorney, Agent, or Firm*—Oblon, Spivak, McClelland, Maier & Neustadt

[57] ABSTRACT

A collision-avoidance method for cooperating carriers consists of:
  transmitting, from each carrier, monochromatic pulsed light waves, coming from at least two wide-field optical transmission devices to cover the space around the carrier and thus define a zone of proximity, the power of the optical transmission defining, under given weather conditions, the range of the transmission and hence the zone covered;
  and receiving, at each carrier, the monochromatic, pulsed light waves radiated into space by other cooperating carriers, on at least two wide-field reception devices covering the space around the carrier. Each intrusion of a carrier into the proximity zone of another carrier prompts the detection of light radiation and the triggering of an alarm on either carrier. Applications are to air anti-collision systems.

3 Claims, 3 Drawing Sheets

COLLISION-AVOIDANCE METHOD FOR COOPERATING CARRIERS AND ONBOARD OPTICAL ASSEMBLY DESIGNED FOR ITS IMPLEMENTATION

BACKGROUND OF THE INVENTION

1. Field of the Invention

The invention relates to the field of air traffic and, more particularly, its object is a collision-avoidance method for cooperating carriers and the device designed to be taken on board cooperating carriers in order to implement it.

The need for aircraft to be able to maneuver in conditions of low visibility or in dense traffic zones necessitates the use of systems enabling the avoidance of collisions.

2. Description of the Prior Art

Anti-collision systems using transmission by radio or by radar waves have been developed.

Systems known as TCAS (Traffic Alert and Collision Avoidance Systems) use interrogators on the ground and transponders carried by aircraft, capable of responding as interrogated, if necessary by the addition, to their response code, of information elements relating for example to their altitude. These systems, of the secondary surveillance radar type, are complicated systems that are very costly.

Other types of systems have been developed, using methods of communication by radio waves and therefore requiring radio dialog for the localization of danger. These systems, apart from their complexity, cannot be used to obtain very fast (almost instantaneous) responses, which are indispensable in the event of a risk of collision, and some of them are subject to the hazards of transmission in certain particular conditions, for example fading, echos, etc.

An object of the invention is a method of collision avoidance for cooperating carriers that is simple and gives an almost instantaneous response, i.e. one that gives information elements to each of the carriers using transmissions of monochromatic light waves made by all the carriers, these light waves being detected by the carriers entering a zone of risk around the corresponding transmitting carrier.

SUMMARY OF THE INVENTION

According to the invention, there is proposed a collision-avoidance method for cooperating carriers, said method consisting:

in transmitting, from each carrier, monochromatic pulsed light waves, coming from at least two wide-field optical transmission devices to cover the space around the carrier and thus define a zone of proximity, the power of the optical transmission defining, under given weather conditions, the range of the transmission and hence the zone covered;

in receiving, at each carrier, the monochromatic, pulsed light waves radiated into space by other cooperating carriers, on at least two wide-field reception devices covering the space around the carrier, each intrusion of a carrier into the proximity zone of another carrier prompting the detection of light radiation and the triggering of an alarm on either carrier.

An object of the invention is an optical set designed to be taken on board the carriers, designed for the implementation of this collision-avoidance method.

BRIEF DESCRIPTION OF THE DRAWINGS

The invention will be understood more clearly and other characteristics will appear from the following description, made with reference to the appended figures, of which.

MORE DETAILED DESCRIPTION

As indicated here above, the method of collision avoidance for cooperating carriers uses means for the transmission of pulsed, monochromatic light waves on board each of the carriers. The transmission of light is a wide-field transmission making it possible to cover the entire useful proximity zone around the carrier, namely in a radius of one kilometer to several kilometers around the aircraft, and at best in every direction. At the same time, the method uses means for the wide-field reception of these same monochromatic light waves. These reception means are placed on board each of the carriers and are, at best, adapted to the reception of the light waves having any direction coming a source at a distance of one or more kilometers.

To ensure optimum safety, each carrier sends out pulsed light waves permanently throughout its period of navigation, or at least as soon as it penetrates a zone where a surveillance operation has to be carried out.

When there is no risk, the reception means do not detect the radiation transmitted by the other moving bodies. By contrast, as soon as the proximity zones of two carriers encroach on each other, each of them detects the radiation transmitted by the other, and this triggers a visual alarm, a sound alarm or any other alarm for the pilot.

To this end, in one embodiment, each aircraft is fitted out with at least two optical transmission-reception systems, placed symmetrically on either side of the carrier, each capable of covering $2\pi$ steradians.

In practice, owing to the shadow zone created by the volume of the carrier itself, both for the transmission and for the reception, a third or even a fourth optical transmission-reception system may be necessary to cover the entire proximity zone of the carrier.

Figure 1A:
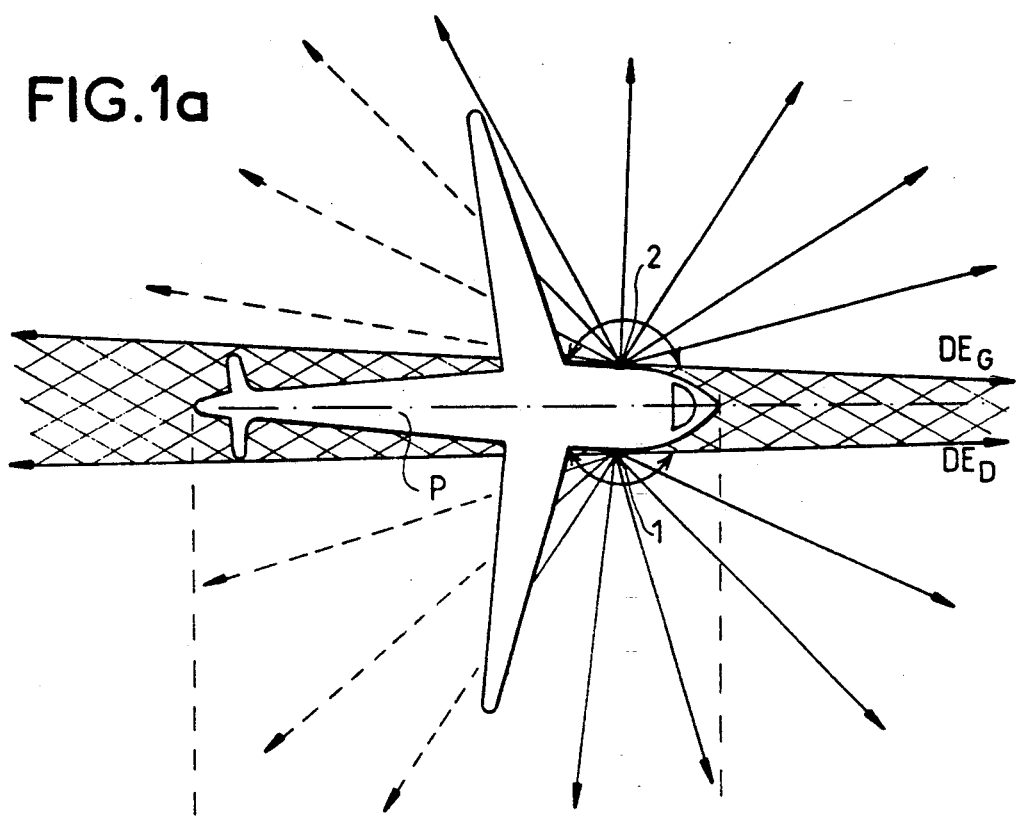
FIGS. 1a and 1b are drawings illustrating the coverage of the proximity zone of a carrier in one mode of implementation of the method of the invention.
Figure 1B:
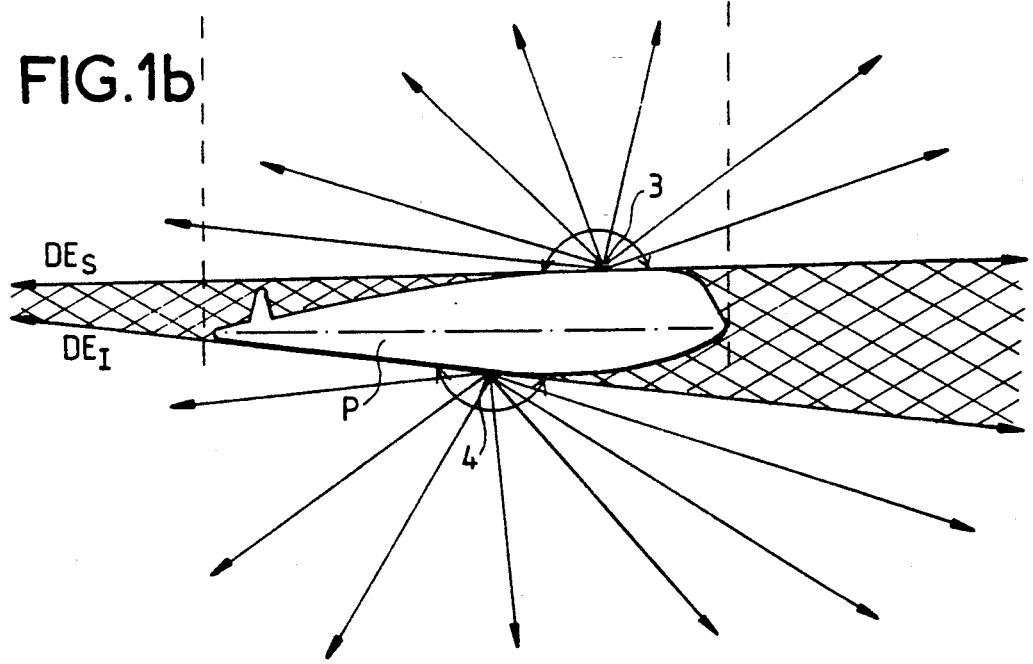

FIGS. 1a and 1b show how it is possible to cover practically the entire proximity zone of a carrier P. In FIG. 1a, which shows a sectional view of the carrier in the "plane" of the wings, two optical transmission-reception systems 1 and 2 have been placed symmetrically on either side of the plane of symmetry of the carrier P; since the optical axes are not quite parallel, the half-spaces that they cover, $DE_D$ to the right and $DE_G$ to the left, overlap towards the front but leave a dihedron of shadow. The vertex of this dihedron is at a small distance in front of the nose of the carrier and the dihedron widens towards the rear. Furthermore, the wings create a small shadow zone in these half-spaces that are not a great source of inconvenience in view of the small volume concealed and because the carriers are moving.

In FIG. 1b, which shows a sectional view of the carrier in its vertical plane, two optical transmission-reception systems 3 and 4 have been placed in the vicinity of the top and bottom points of the aircraft to cover respectively the upper half-space $DE_S$ and lower half-space $DE_I$. As in FIG. 1a, since their optical axes are angularly offset, a dihedron of shadow is defined, the vertex of which is at a small distance from the rear of the carrier and opens out towards the front.

With parallel optical axes, it is a zone of space in the form of a dihedron that is not covered by a set of two systems.

Depending on the type of aircraft and on the possible zones for the installation of the optical transmission-reception systems, and if necessary in taking other useful criteria into consideration, a full set of equipment for an aircraft could comprise:

only two systems as shown in either of the FIGS. 1a and 1b possibly with other orientations of optical axes, or possibly in other positions, notably in the tail of the aircraft;

three systems, for example the two systems illustrated in FIG. 1a and a complementary system placed in the tail of the aircraft to cover the dihedron of shadow illustrated in FIG. 1a, or the two systems illustrated in FIG. 1b and a complementary system placed in the nose of the aircraft to cover the dihedron of shadow illustrated in FIG. 1b. A configuration such as this enables a complete coverage of the proximity zone;

more than three systems, and notably four, to ensure complete coverage of the proximity zone with redundancy if necessary; a configuration of this type with more than three systems can also be used to cover the entire proximity zone even if the field covered by each system is smaller than $2\pi$ steradians.

Indeed, as shall be explained hereinafter, the cost of each transmission-reception system can be low.

Thus, the entire volume surrounding the carrier in a so-called proximity zone is covered.

Each optical transmission-reception system comprises two devices, one for the optical transmission and the other for the reception.

Figure 2:
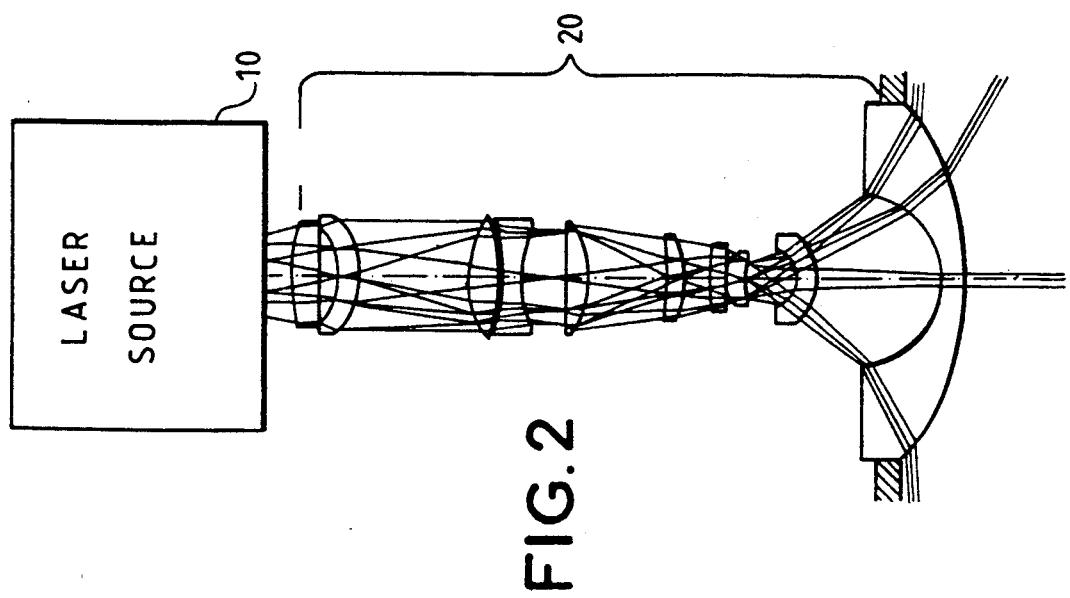
FIG. 2 illustrates an embodiment of an transmission device placed on board carrier aircraft.

One embodiment of the optical transmission device mounted on board aircraft is shown in a sectional view in FIG. 2. It comprises a relatively high-powered (1 to 10 MW for example) laser source 10 designed to transmit pulsed radiation of a given wavelength, at a relatively low rate of 10 Hertz for example. This laser source is associated with a wide-field afocal optical device 20, of which only the sequence of optical elements (without the frame) is shown. From the parallel radiation or radiation with little scattering transmitted by the laser source, this device 20 transmits a laser flux in a wide field that can go up to one half-space (namely 180° in section as illustrated in FIG. 2). It is possible to use YAG lasers as laser sources: owing to the scattering of the radiation in a half-space, the distance from which eye safety is ensured is low (typically less than one meter). It is also possible to use laser diodes because the directivity of the beam is not a constraint. Nor for that matter is the quality of the beam a constraint. On the same grounds, the wide-field afocal objective shown in FIG. 2, which comprises 10 lenses, can also be replaced by a simpler optical system, even by a single divergent lens, provided that the distribution of the luminous power is done more or less regularly throughout the field covered.

Figure 3:
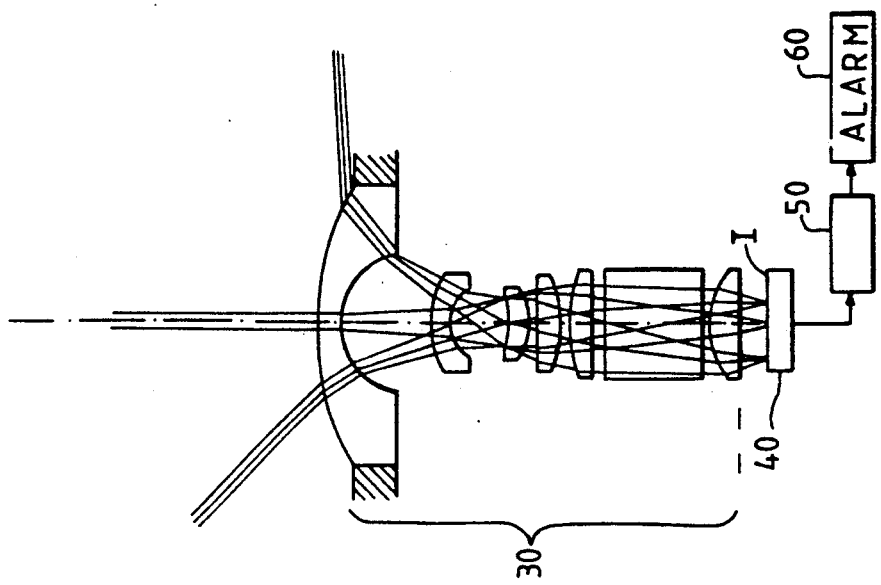
FIG. 3 illustrates an embodiment of the reception device placed on board carrier aircraft.

The other onboard optical device is the reception device, an embodiment of which is illustrated by FIG. 3. This reception device is constituted by a fish-eye type objective 30 that enables the focusing, in an image plane, of the radiation coming from any direction of its field between $-90°$ and $+90°$ of the optical axis on the figure, this focusing being done on an elementary surface, the radius of which is of the same order as the radius of the lenses of the optical system. A plane photosensitive detector 40, of the photodiode, charge transfer device or photodiode matrix type, is placed in the image plane; the photosensitive zone of the detector is matched with the wavelength of transmission of the sources used in the transmission devices. The detected signal is read and processed in a reading and processing circuit 50, connected to an alarm 60 that is triggered upon the detection of radiation at the wavelength used and at a significant level. The constraints for this reception device are that it should be capable of receiving in a wide field (preferably a half-space) and that the detector should give an image of this field in its entirety. The succession of the optical elements shown in FIG. 3 is not exhaustive, and the optical device may be replaced by a very simple system with a smaller number of elements.

Figure 4:
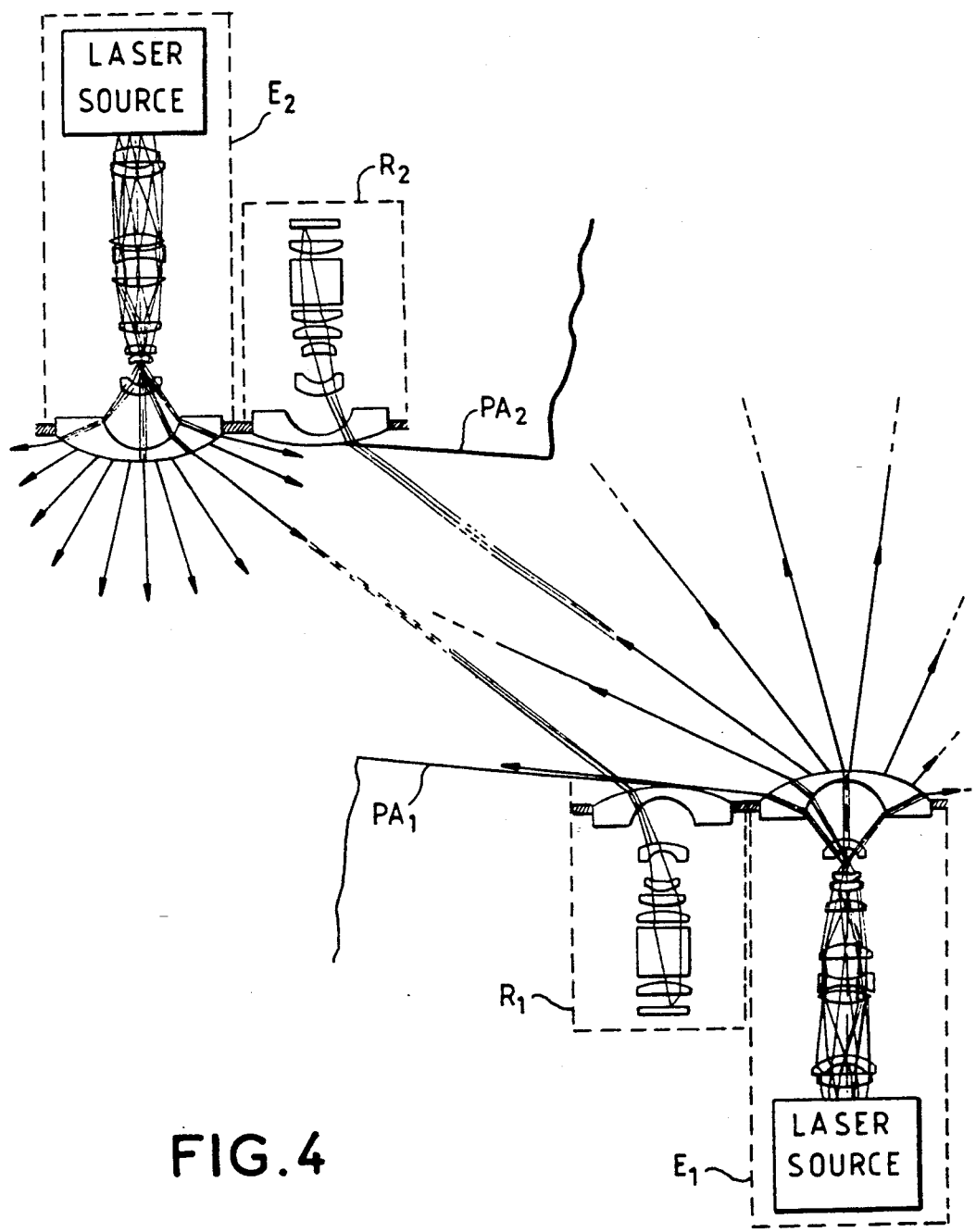
FIG. 4 illustrates the working of the system.

FIG. 4 illustrates the working of the system with two transmission-reception sets, each borne by an aircraft: a first aircraft, the skin $PA_1$ of which is shown, has an transmission device $E_1$ similar to the one shown in FIG. 2 and a reception device $R_1$ similar to the one shown in FIG. 3. Similarly, a second aircraft, the skin $PA_2$ of which has been shown, has a transmission device $E_2$, similar to the one shown in FIG. 2 and a reception device $R_2$ similar to the one shown in FIG. 3. Other transmission-reception assemblies, each borne by aircraft to cover the rest of the field, have not been shown in FIG. 4.

The system works as follows: each aircraft in a watching state, from the laser sources of its transmission devices, transmits light pulses at a predetermined rate throughout the space covered and, in this way, demarcates a proximity zone, the radius of which is the limit of the range of the optical systems. As soon as another carrier penetrates the proximity zone, thus defined, of the first carrier, its reception device will pick up a small fraction of the radiation transmitted by the first carrier. In the same way, the second carrier, which has just entered the proximity zone of the first carrier, itself also sends out pulses, from each laser source, into the proximity zone defined around it. A fraction of the radiation transmitted by the second carrier will be picked up by the reception device $R_1$ borne by the first carrier. The reception, by the devices $R_1$ and $R_2$ respectively, triggers an alarm on board both the first carrier and the second carrier. The matrix character of the sensor 40 of the reception devices also enables each of the carriers to localize the direction of the carrier that has just entered its proximity zone. The watching phase is then ended and the carriers can enter an active phase designed to avert the danger by modifications of their paths.

For this purpose, the transmission device may be complemented by modulation devices and a chronometer system may be used to deduce the distance of the danger from the transmission-reception times.

In a particular embodiment, the transmission devices have been constituted as follows:

a laser source with power of 1.3 MW at a rate of 10 Hertz;

a wide-field afocal objective with magnification equal to 5.

If the scattering of the beam at the output of the source is of the order of 18°, it is then possible to cover one half-space ($2\pi$ steradians) by a transmission device such as this.

Again in a particular embodiment, the reception device has the following characteristics:

the diameter of the reception pupil is of the order of 3 mm;

the detector is a matrix of PIN photodiodes with an interference filter, the sensitivity of which is evaluated at $10^{-7}$ Watts.

For an example such as this, if it is assumed that the optical transmission of the system is of the order of 0.8 and the atmospheric transmission in fine weather is of the order of 0.8 for one kilometer in fine weather and 0.1 for one kilometer in poor weather (which corresponds to extremely poor weather conditions), the system thus constituted may have a range of 2.5 kilometers in fine weather and 1 kilometer in poor weather. Furthermore, the entire space is scrutinized in 0.1 second since, and this is a major promising feature of the invention, there is no need for any scanning nor for any interrogation-response procedure that would necessitate exchanges of messages.

As indicated here above, the invention is not restricted to the embodiments specifically described and illustrated. In particular, the optical devices may be simplified, provided that the transmission device is a wide-field transmission device and that the reception device enables detection also in a wide field.

Furthermore, in the foregoing description, it has been assumed that the fields covered in transmission and in reception are the same, and this is why it has been assumed that a reception device is paired with each of the transmission devices. This arrangement is clearly not restrictive, and it is clearly possible to set up the transmission devices and the reception devices independently for there is no necessary pairing between the two, the only condition being that, for transmission as for reception, the field covered should be the entire space around the carrier.

Finally, transmission at constant power leads to a variation in the range as a function of weather conditions. It is possible to provide for adjustable power lasers to increase the transmission power should weather conditions reduce optical transmission in the atmosphere.

What is claimed is:

1. A collision-avoidance method for cooperating carriers, said method comprising the steps of:

transmitting, from each carrier monochromatic pulsed lightwaves, coming from four wide-field optical transmission devices to cover the entire zone surrounding each of said carrier simultaneously to define a zone of proximity with the power of the optical transmission defining, under given weather conditions, the range of the transmission and thus the zone covered;

receiving, at each carrier, monochromatic, pulsed lightwaves radiated into the space by other cooperating carriers, on four wide-field optical reception devices covering into the proximity zone of another carrier prompting the detection of light radiation and the triggering of an alarm of either carrier;

placing a first two of said four optical transmission devices on a respective side of each of said carriers on either side of the vertical plane of symmetry of said carriers wherein the optical axes of said first two carriers are slightly offset from a parallel relationship in such a way that the spaces covered by each of the transmissions of the said first two transmission devices, in the horizontal plane of said carrier, overlap at a first predetermined distance from said carrier in one of a front and rear of said carrier and wherein the spaces covered by each of the transmissions of said first two transmission devices in the horizontal plane of said carrier, do not overlap in the other one of said front and rear of said planes;

placing a second two of said four optical transmission devices on the top and bottom of said carrier symmetrical about a horizontal plane of said carrier in such a manner that the optical axes of said second two carriers are slightly offset from being parallel in order to provide that spaces covered by each of the transmissions of said second two transmission devices, in a vertical plane of said carrier, do not overlap in said one of the front and rear of said carrier and wherein the spaces covered by each of the transmissions of said second two devices, in said vertical plane of said carrier, overlap at a second predetermined distance from said carrier to thereby provide substantially full volume coverage of the area surrounding each of said carriers.

2. A method according to claim 1, wherein the volume of area having a radius greater than the longest of said first and second distances is entirely covered by said four transmitter devices.

3. A method according to claim 1, wherein said first and second distances are a function of said offsets of each one of said first and second two transmitters with respect to each other.

* * * * *